United States Patent [19]
Bair et al.

[11] Patent Number: 6,016,696
[45] Date of Patent: Jan. 25, 2000

[54] METHOD FOR DETERMINING VOLUME CHANGES IN VISCOUS LIQUIDS

[75] Inventors: Harvey Edward Bair, Chester, N.J.; Arturo Hale, New York, N.Y.; Marcia Lea Schilling, Basking Ridge, N.J.

[73] Assignee: Lucent Technologies Inc., Murray Hill, N.J.

[21] Appl. No.: 09/162,486

[22] Filed: Sep. 25, 1998

[51] Int. Cl.[7] .................................................. G01F 17/00
[52] U.S. Cl. ............................................................. 73/149
[58] Field of Search ............................... 73/149; 422/68.1

[56] References Cited

U.S. PATENT DOCUMENTS

| | | | |
|---|---|---|---|
| 4,002,056 | 1/1977 | Kopito et al. | 73/149 |
| 4,027,660 | 6/1977 | Wardlaw et al. | 73/149 |
| 4,077,396 | 3/1978 | Wardlaw et al. | 73/149 |
| 4,143,274 | 3/1979 | Apfel | 73/149 |
| 4,567,754 | 2/1986 | Wardlaw et al. | 73/149 |
| 4,852,028 | 7/1989 | Korpela et al. | 73/149 |
| 5,608,157 | 3/1997 | Orr et al. | 73/149 |
| 5,837,892 | 11/1998 | Cavallaro et al. | 73/149 |

OTHER PUBLICATIONS

"Volumetric Contraction Measured by a Computer–Controlled Mercury Dilatomer", by Reed, B. et al., *International Assoc. Dental Res.* Abstract 2184 pp. 1–7 (1996).

"Kinetic Measurements of Photo–Polymerization Contraction in Resins and Composites", by Watts, D. C. et al., *Meas. Sci. Technol.*, pp. 788–794 (1997).

"Modeling of UV Oligomers and Monomers Properties: Viscosity and Shrinkage", by Pezron, E. et al., RadTech '96 North American UV/EB Conference Proceedings, Nashville, Tennessee, pp. 99–106 (1996).

*Primary Examiner*—Hezron Williams
*Assistant Examiner*—Chad Soliz
*Attorney, Agent, or Firm*—Patricia A. Verlangieri

[57] ABSTRACT

A method for determining a volume change of a viscous liquid during a physical or chemical process is disclosed. The volume change of the viscous liquid is determined by confining a layer of a viscous liquid on a portion of a rigid body and then measuring the linear (one dimensional) displacement of a planar surface formed thereon, as the viscous liquid undergoes the physical or chemical process. The surface of the layer of the viscous liquid is planar relative to the rigid body.

31 Claims, 4 Drawing Sheets

METHOD FOR DETERMINING VOLUME CHANGES IN VISCOUS LIQUIDS

FIELD OF THE INVENTION

The present invention relates generally to viscous liquids, and more particularly, to a method for determining volume changes of viscous liquids during a physical or chemical process.

DESCRIPTION OF THE RELATED ART

Some viscous liquids (e. g., acrylate-based prepolymers) undergo volume changes during a physical or chemical process such as a phase change or polymerization. The term viscous liquid as used in this disclosure refers to a liquid having a viscosity greater than about 15 Pa-sec (Pascal-seconds). The term volume change as used in this disclosure refers to either an increase in the physical dimensions of the viscous liquid or a reduction in the physical dimensions of the viscous liquid. Viscous liquids undergo volume changes in directions parallel and/or perpendicular to the-plane of a layer of the liquid.

Several techniques are used to evaluate changes in the volume of viscous liquids, during physical and/or chemical processes. One technique, described in Reed, B. et al., "Volumetric Contraction Measured By A Computer-Controlled Mercury Dilatometer", Abstract 2184, International Association Dental Research (1996) uses a dilatometer.

A cross-sectional view of a portion of a dilatometer 10 typically used for measuring volume changes of viscous liquids is shown in FIG. 1. The dilatometer 10 has a glass column 11 filled with a fluid 12 (e. g., mercury, water). A sample 13 of the viscous liquid is placed in the glass column 11 and is surrounded by the fluid 12. After the sample 13 is placed in the glass column 11 and surrounded by the fluid 12, the height of the fluid 12 in the glass column 11 is measured. Thereafter, the sample 13 undergoes a volume change. Since the fluid 12 in the glass column 11 surrounds the sample 13, any changes in the height of the fluid 12 in the glass column 11 are related to changes in the volume of the viscous liquid. Thus, for the dilatometer 10, the volume changes of the viscous liquid are determined by multiplying the linear height changes of the fluid 12 by the cross-sectional area of the fluid in the glass column 11.

Many viscous liquids initiate exothermic reactions as they undergo volume changes. Some viscous liquids generate heats on the order of about 100–700 J/g (Joules/gram). Such heats potentially raise the temperature of the fluid 12 in the glass column 11 of the dilatometer 10, causing such fluid to expand. Expansion of the fluid 12 due to an exothermic reaction is undesirable because a portion of the linear height changes for the fluid 12 in the glass column 11 of the dilatometer 10 will be attributable to heating the fluid rather than volume changes of the viscous liquid, thereby introducing errors into measurements of volume changes for some viscous liquids.

Additionally, when the viscous liquid includes a photoactive monomer, the opacity of the fluid 12 filling the glass column 11 of the dilatometer 10 affects the extent to which the viscous liquid undergoes a volume change. The term photoactive monomer as used in this disclosure refers to a material that undergoes a chemical process in response to light. The light generates radicals or cationic species from a photoinitiator present within the liquid which irreversibly convert the viscous liquid into a rubbery or glassy product. Mercury is not transparent to light. Thus, mercury filled dilatometers are undesirable for use with viscous liquids that include photoactive monomers because insufficient amounts of light can penetrate the mercury to convert such liquids to rubbery or glassy products.

Another technique used to evaluate volume changes of viscous liquids is discussed in Watts, D. C. et al., "Kinetic Measurements of Photo-Polymerization Contraction in Resins and Composites", Meas. Sci. Technol., Vol. 2, pp. 788–794 (1991). Watts et al. measures volume changes in photoactive liquids by measuring the displacement of the photoactive liquid as it hardens.

The Watts et al. technique is illustrated in FIGS. 2A–2B. FIG. 2A shows a cross-sectional view of a brass ring 20 adhesively bonded to a rigid body 21. A sample of a photoactive liquid 22 is placed within the confines of the brass ring 20 and covered with a flexible diaphragm 23. The flexible diaphragm 23 has a convex top surface 27 in relation to the rigid body 21. The photoactive liquid 22 is then hardened by exposing it to light. When the photoactive liquid hardens, the flexible diaphragm 23 is displaced towards the rigid body 21, as shown in FIG. 2B. The displacement of the flexible diaphragm 23 is smaller near its edges than at the center thereof. For example, the displacement measured at point A, denoted as 25, located near the edge of the flexible diaphragm 23 is smaller than the displacement measured at point B, denoted as 26, located near the center of the flexible diaphragm 23. After the photoactive liquid is hardened, its volume change is determined as a function of the, displacement for the flexible diaphragm 23. Since the displacement for the flexible diaphragm 23 varies depending on its point of measurement, the Watts et al. technique potentially provides inconsistent results.

Thus, techniques for determining volume changes of viscous liquids continue to be sought.

SUMMARY OF THE INVENTION

The present invention is directed to a method for determining a volume change of a viscous liquid during a physical or chemical process. The volume change of the viscous liquid is determined by confining a layer of a viscous liquid on a portion of a rigid body and then measuring the linear (one dimensional) displacement of a planar surface formed thereon, as the viscous liquid undergoes the physical or chemical process. The surface of the layer of the viscous liquid is planar relative to the rigid body.

Forming a planar surface on the layer of the viscous liquid relative to the rigid body is desirable because the measurement of its linear displacement does not vary significantly across the surface thereof. Additionally, confining the viscous liquid on a portion of the rigid body prevents the displacement of the viscous liquid in a direction parallel to the plane of the layer, so the total volume change for the viscous liquid is linear, occurring in a direction perpendicular to the plane of the layer.

In one embodiment of the present invention, a layer of a viscous liquid is confined in a reservoir on a rigid body. The reservoir has sidewalls and a bottom surface. The sidewalls and bottom surface of the rigid body are preferably at least 0.5 mm (millimeters) thick. Sidewalls and bottom surfaces that are less than 0.5 mm thick are undesirable because they potentially deform when the viscous liquid undergoes the physical or chemical process providing inconsistent displacement measurements for the planar surface of the viscous liquid.

The reservoir can be formed in the material of the rigid body. Alternatively, the reservoir is formed on the surface of the rigid body by adhesively bonding a spacer thereto. The spacer forms the sidewalls of the reservoir.

The rigid body is made of a material that is non-reactive with respect to the viscous liquid (e. g., does not undergo a physical or chemical process therewith). When the viscous liquid undergoes a physical or chemical process in response to light, the rigid body is preferably made of a material that is transparent to light. An example of a suitable material is quartz. Examples of viscous liquids that are non-reactive with quartz include epoxies and acrylate-based prepolymers useful as a holographic recording medium. Both the spacer and the adhesive are also made from a material that is non-reactive with respect to the viscous liquid. Examples of suitable spacer materials include teflon, rubber o-rings, and double-sided adhesive tape.

When the spacer is adhesively bonded to the rigid body, a planar surface is formed on the layer of the viscous liquid by compressing a flat surface of another rigid body thereto.

Alternatively, when the reservoir is formed in the material of the rigid body, a planar surface is formed on the layer of the viscous liquid by controlling the surface energy of the sidewalls and the bottom surface of the reservoir so they have a surface energy less than or about equal to the surface energy of the viscous liquid to be confined therein. The term surface energy as used in this disclosure refers to an energy needed to form a boundary region between two adjacent phases.

The surface energy of the reservoir is controlled by coating it with a material that lowers the surface energy thereof, prior to confining the layer of the viscous liquid therein. Coating the reservoir with a material that lowers the surface energy therein, makes the sidewalls and bottom surface of the reservoir less wettable. Less wettable surfaces in the reservoir are desirable because they inhibit the formation of a meniscus between the sidewalls of the reservoir and the viscous liquid, thus forming a planar surface on the layer of the viscous liquid confined within the reservoir.

The material used to lower the surface energy in the reservoir is formed from a solution of a low surface energy compound in a solvent. The surface energy of the material formed from the solution depends on the particular low surface energy compound used as well as its concentration in the solvent. Typically, materials with surface energies less than about 40 $mJ/m^2$ are sufficient for forming a planar surface on viscous liquids confined within the reservoir of the rigid body. Examples of low surface energy compounds suitable for lowering the surface energy in the reservoir to less than about 40 $mJ/m^2$ are alkyl silanes, siloxanes, and polyfluorocarbon compounds. Suitable solvents for the alkyl silanes include water and alcohols such as ethanol, and isopropanol. Solvents suited for use with siloxanes include alkanes such as octane and hexane. Perfluorinated solvents such as Fluorinert (commercially available from 3M Corp.) are suited for use with polyfluorocarbon compounds.

The reservoir is coated with the low surface energy material by applying the solution to the rigid body and then removing the solvent. The solution is applied to the rigid body using any suitable method including spraying and dipping. After the solution is applied to the rigid body, the solvent is removed by heating and/or drying the rigid body.

After the reservoir is coated with the low surface energy material, the viscous liquid is confined within the reservoir. The viscous liquid is confined within the reservoir by placing an amount of the viscous liquid in the reservoir. The viscous liquid is placed in the reservoir using any suitable method such as with a syringe.

After the layer of the viscous liquid having a planar surface is confined within the reservoir, a probe is counterbalanced on the layer of viscous liquid. The probe is counterbalanced with weights. The probe is counterbalanced on the surface of the layer of viscous liquid so the axis of the tip is perpendicular to the plane of the layer of the viscous liquid. When the probe tip is counterbalanced on the layer of the viscous liquid, it touches the surface with a force such that the probe descends below the planar surface of the viscous liquid with a rate that is substantially less than that during the at least partial reacting of the viscous liquid. Otherwise, the probe tip potentially sinks into the layer of the viscous liquid affecting thickness measurements therefor.

It is preferable for the viscous liquid to have a viscosity greater than about 15 Pa-sec (Pascal-seconds). Viscous liquids with viscosities less than about 15 Pa-sec are undesirable because measurement errors associated with counterbalancing the probe tip on the surface thereof potentially occur.

The probe tip preferably has a diameter greater than about 0.5 mm (millimeters). Probe tips with diameters greater than about 0.5 mm are desirable because the oscillations thereof are easier to control. Additionally, the probe tip is optionally treated with the low surface energy compound to prevent the formation of a meniscus between the probe tip and the viscous liquid when the probe tip contacts the planar surface therefore.

After the probe tip is counterbalanced on the planar surface of the viscous liquid, the thickness of the layer of the viscous liquid is determined. The thickness of the layer of the viscous liquid is determined relative to the bottom surface of the reservoir.

Once the thickness of the layer of the viscous liquid is determined, the viscous liquid is at least partially reacted. The term reacted as used in this disclosure refers to a physical or a chemical process whereby the viscous liquid undergoes a volume change. The viscous liquid is at least partially reacted using any suitable method including exposure to light or heat. The reaction method used depends on the composition of the viscous liquid.

As the viscous liquid reacts, the surface of the layer of the viscous liquid as well as the probe tip touching it are displaced in a direction perpendicular to the plane of the layer. The displacement of the probe tip is a measure of the linear displacement for the viscous liquid as it is reacts. Thereafter, the volume change for the partially reacted viscous liquid is determined as a function of the linear displacement for the layer of the viscous liquid.

In an alternate embodiment of the, present invention, the viscous liquid is confined between two rigid bodies. The viscous liquid is confined between the two rigid bodies using any suitable method including an adhesive and/or a spacer. At least one of the two rigid bodies preferably has a planar surface which contacts the viscous liquid forming the planar surface on the layer of the viscous liquid confined therebetween.

The two rigid bodies are preferably at least 0.1 mm (millimeters) thick. Rigid bodies that are less than 0.1 mm thick are undesirable because they potentially deform when the viscous liquid reacts providing inconsistent displacement measurements for the planar surface of the viscous liquid. Suitable materials for the two rigid bodies include quartz and/or glass slides.

After the layer of the viscous liquid is confined between the two rigid bodies, the probe is counterbalanced on an outer surface of one of the two rigid bodies. The probe tip touches the outer surface of one of the two rigid bodies without oscillating. The thickness of the layer of the viscous liquid is determined relative to the thicknesses of the two rigid bodies. Thereafter, the viscous liquid is at least partially reacted, the linear displacement of the probe tip measured, and the volume change for the viscous liquid determined, as described above.

Other objects and features of the present invention will become apparent from the following detailed description considered in conjunction with the accompanying drawings. It is to be understood, however, that the drawings are designed solely for purposes of illustration and do not serve to limit this invention, for which reference should be made to the appended claims.

DETAILED DESCRIPTION

The present invention is directed to a method for determining a volume change of a viscous liquid during a physical or chemical process. The volume change of the viscous liquid is determined by confining a layer of a viscous liquid on a portion of a rigid body and then measuring the linear (one dimensional) displacement of a planar surface formed thereon, as the viscous liquid undergoes a physical or chemical process. The surface of the layer of the viscous liquid is planar relative to the rigid body.

Forming a planar surface on the layer of the viscous liquid relative to the rigid body is desirable because the measurement of its linear displacement does not vary significantly across the surface thereof. Additionally, confining the viscous liquid on a portion of the rigid body prevents the displacement of the viscous liquid in a direction parallel to the plane of the layer, so the total volume change for the viscous liquid is one dimensional, occurring in a direction perpendicular to the plane of the layer.

Figure 1:
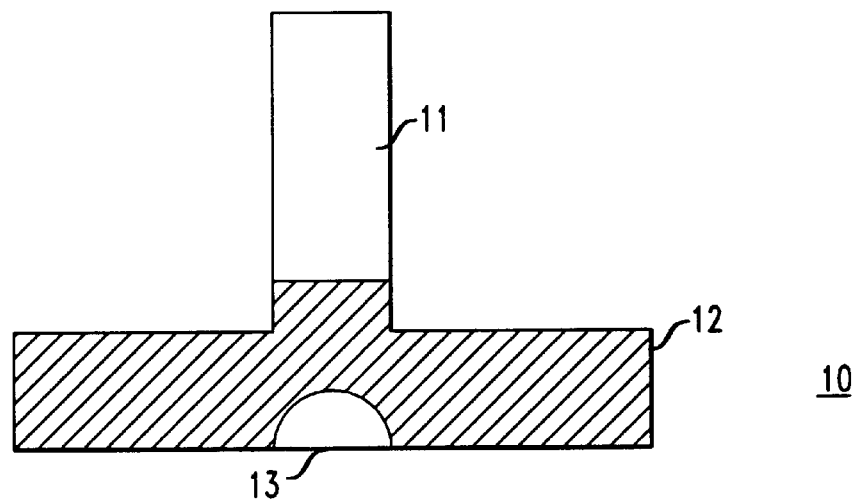
FIG. 1 is a cross-sectional view of a portion of a dilatometer typically used for measuring volume changes of viscous liquids as they undergo a physical or chemical process.
Figure 2A:
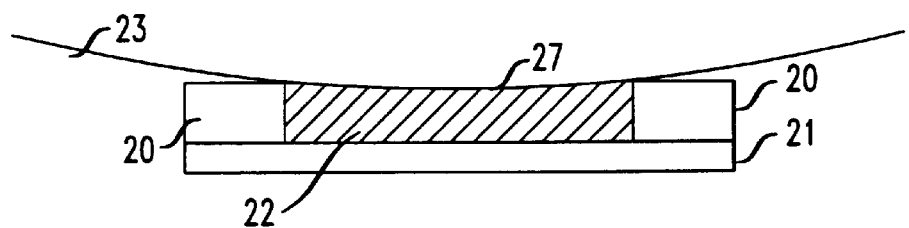
FIG. 2A is a cross-sectional view of a photoactive liquid confined between a flexible diaphragm and a rigid body.
Figure 2B:
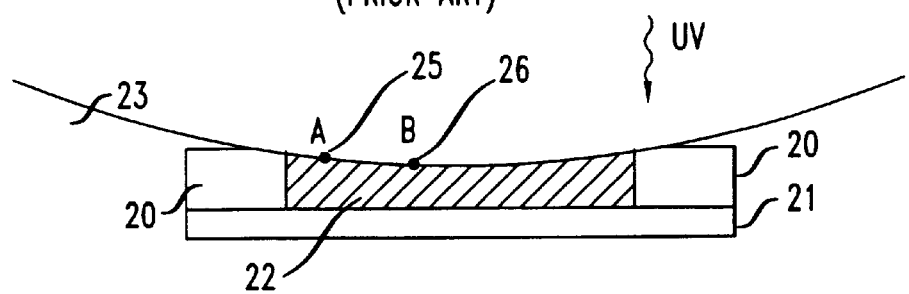
FIG. 2B depicts the cross-sectional view of FIG. 2A after the photoactive liquid undergoes a physical or chemical process.
Figure 3:
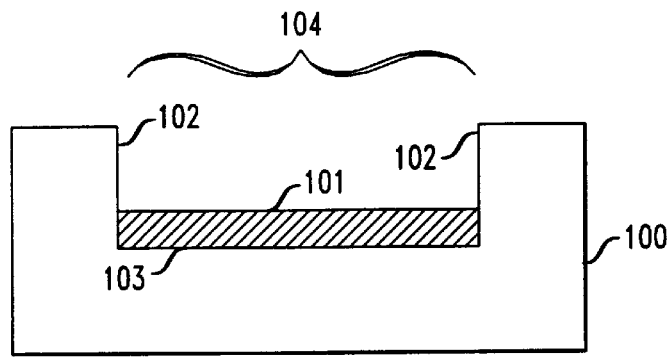
FIG. 3 illustrates the method of the present invention wherein a layer of a viscous liquid is confined in a reservoir on a rigid body.

In one embodiment of the present invention, a layer of viscous liquid 101 is confined within a reservoir 104 of a rigid body 100, as shown in FIG. 3. The reservoir 104 has sidewalls 102 and a bottom surface 103. The sidewalls 102 and bottom surface 103 of the rigid body are preferably at least 0.5 mm (millimeters) thick. Sidewalls 102 and bottom surfaces 103 that are less than 0.5 mm thick are undesirable because they potentially deform when the layer of the viscous liquid 101 undergoes the physical or chemical process providing inconsistent displacement measurements for the planar surface of the viscous liquid.

The reservoir 104 can be formed in the material of the rigid body 100, as shown in FIG. 3. Alternatively, the reservoir is formed on the surface of the rigid body by adhesively bonding a spacer thereto (not shown). The spacer forms the sidewalls of the reservoir while the rigid body forms the bottom surface.

The rigid body 100 is made of a material that is non-reactive with respect to the viscous liquid (e. g., does not undergo a physical or chemical process therewith). When the viscous liquid undergoes a physical or chemical process in response to light, rigid body 100 is preferably made of a material that is transparent to light. An example of a suitable material is quartz.

Examples of viscous liquids that are non-reactive to quartz include epoxies and acrylate-based prepolymers useful as a holographic recording medium. A suitable epoxy is diglycidyl ether of bisphenol-A mixed with a compound chosen from the group consisting of amines, polyamides, anhydrides, acids, and phenols. Acrylate-based polymers useful as a holographic recording medium include mixtures of at least one monomer and a photoiniator, mixtures of an oligomer and a photoinitiator, and mixtures of at least one monomer, an oligomer and a photoinitiator.

Suitable monomers include isobornyl acrylate, 2-phenoxyethyl acrylate, di(ethyleneglycol) ethyl ether acrylate, N-carbazoylethyl acrylate, N-vinylcarbazole, vinylbenzoate, vinylnaphthoate, dichlorovinylbenzoate, N-vinyl-2-pyrrolidinone, vinyl 2-naphthylmercaptoacetate, benzylbenzoate, and stilbene. Suitable oligomers include urethane acrylate end groups attached to a backbone such as a polyether, a polyester, a polycarbonate, and a polysiloxane.

The photoinitiator is optionally activated using visible or ultraviolet light. Suitable photoinitiators which are activated using visible light include bis($\eta$-5-2, 4-cyclopentadien-1-yl) bis[2,6-difluoro-3-(1H-pyroll-1-yl)phenyl]titanium (commercially available from Ciba Specialty Chemicals as CGI-784). Suitable photoinitiators which are activated using ultraviolet light include 2,2-diethoxyacetophenone, benzophenone, p-methoxybenzophenone, acetophenone, propiophenone, xanthone, benzoin, benzil, naphthoquinone, anthraquinone, t-butylperbenzoate, 1-hydroxycyclohexylphenyl ketone, and 2-hydroxy-2-methyl-1-phenylpropan-1-one.

Additionally, both the spacer and the adhesive are also made from a material that is non-reactive with respect to the viscous liquid. Examples of suitable spacer materials include teflon, rubber o-rings, and double-sided tape.

When the spacer is adhesively bonded to the rigid body, a planar surface is formed on the layer of the viscous liquid by compressing a flat surface of another rigid body thereto.

Alternatively, when the reservoir is formed in the material of the rigid body, a planar surface is formed on the layer of the viscous liquid 101 confined within the reservoir 104 by controlling the surface energy of the sidewalls 102 andithe bottom surface 103 thereof so they have a surface energy less than or about equal to the surface energy of the viscous liquid to be confined therein. The term surface energy as used in this disclosure refers to an energy needed to form a boundary region between two adjacent phases.

Prior to confining the layer of the viscous liquid in the reservoir, the surface energy of the reservoir is controlled by coating it with a material that lowers the surface energy thereof. Coating the reservoir with a material that lowers the surface energy therein, makes the sidewalls and bottom surface of the reservoir less wettable. A less wettable surface in the reservoir is desirable because it inhibits the formation of a meniscus between the sidewalls of the reservoir and the viscous liquid, thus forming a planar surface on the layer of the viscous liquid confined within the reservoir.

Figure 4:
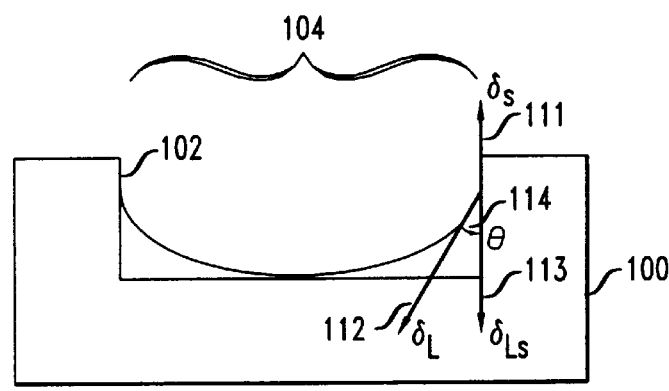
FIG. 4 illustrates the wetting ability of the reservoir surface by a liquid.

The wetting ability of a solid surface by a liquid is described by As shown in FIG. 4, equation (1) relates the surface energy of the reservoir sidewalls ($\gamma_s$), denoted as 111, with the surface energy of a liquid ($\gamma_L$) in contact therewith, denoted as 112, the surface energy of the liquid-sidewall interface ($Y_{LS}$), denoted as 113, and the contact angle ($\cos\theta$) between the liquid and the reservoir sidewalls, denoted as 114. Based on equation (1), complete wetting of the reservoir sidewalls occurs when $\theta$ is zero degrees. $\theta$ approaches zero degrees, forming a meniscus between the sidewalls and the liquid, when the surface energy of the reservoir sidewalls is larger than the surface energy of the liquid.

The material used to lower the surface energy in the reservoir is formed from a solution of a low surface energy compound in a solvent. The surface energy of the material formed from the solution depends on the particular low surface energy compound used as well as its concentration in the solvent. Typically, materials with surface energies less than about 40 mJ/m$^2$ are sufficient for forming a planar surface on viscous liquids confined within the reservoir of the rigid body.

Examples of suitable low surface energy compounds useful for lowering the surface energy in the reservoir to less than about 40 mJ/m$^2$ are alkyl silanes, siloxanes, and polyfluorocarbon compounds. Suitable alkyl silanes include alkyl alkoxysilanes such as octadecyltrimethoxy silane, alkyl chlorosilanes such as octadecyltrichlorosilane. Suitable siloxanes include functionalized polysiloxanes such as alkoxy-terminated polydimethylsiloxane. Polyfluorocarbon compounds include fluoroalkyl alkoxysilanes such as 1, 1, 2, 2-perfluorodecyltriethoxysilane, fluoroalkyl chlorosilanes such as 1, 1, 2, 2-perfluorodecyltrichlorosilane, fluorinated acrylates such as poly(pentadecafluorooctyl acrylate), as well as solutions of FC-722 and FC-724 (commercially available from 3M Corporation), Teflon-AF which is a copolymer of perfluoro-2,2-dimethyldioxole and tetrafluoroethylene (commercially available from DuPont Company), and CYTOP which is a cyclized homopolymer of perfluorovinylbutenylether (commercially available from Asahi Glass Company). Suitable solvents for the alkyl silanes include water and alcohols such as ethanol, and isopropanol. Solvents suited for use with siloxanes include alkanes such as octane and hexane. Perfluorinated solvents such as Fluorinert (commercially available from 3M Corp.) are suited for use with polyfluorocarbon compounds.

The reservoir is coated with the low surface energy material by applying the solution of the low surface energy compound in the solvent to the rigid body and then removing the solvent. The solution is applied to the rigid body using any suitable method including spraying and dipping. After the solution is applied to the rigid body, the solvent is removed by heating and/or drying the rigid body.

After the reservoir is coated with the low surface energy material, the viscous liquid is confined within the reservoir. The viscous liquid is confined within the reservoir by placing an amount of the viscous liquid in the reservoir. The viscous liquid is placed in the reservoir using any suitable method such as a syringe.

Figure 5:
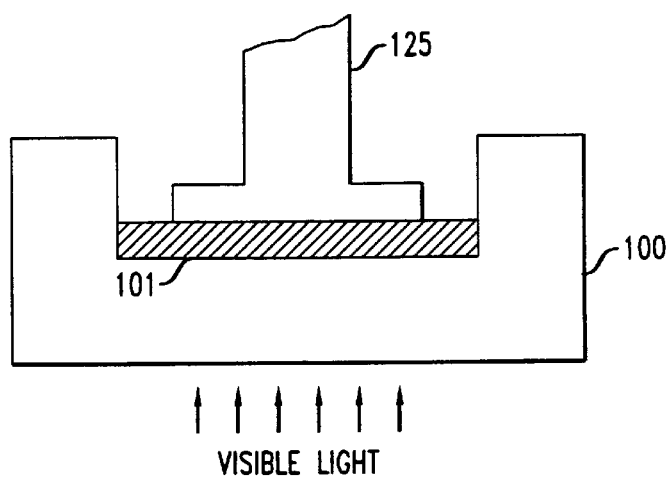
FIG. 5 is a cross-sectional view of a portion of a probe counterbalanced on the layer of the viscous liquid confined in the reservoir of the rigid body.

After the layer of the viscous liquid having a planar surface is confined within the reservoir, a probe 125 is counterbalanced on the layer of viscous liquid 101, as shown in FIG. 5. The probe is preferably counterbalanced using a dynamic mechanical analyzer (DMA) (not shown). A suitable DMA is a Model 7e DMA commercially available from Perkin-Elmer Co. In the DMA, the probe 125 is counterbalanced on the viscous liquid 101 with weights (not shown). Typically, the probe 125 is counterbalanced on the viscous liquid with a force less than about 10 milligrams.

The probe 125 is counterbalanced on the surface of the layer of viscous liquid 101 so the axis of the tip is perpendicular to the plane of the layer of the viscous liquid. When the probe tip is counterbalanced on the layer of the viscous liquid, it touches the surface with a force such that the probe descends below the planar surface of the viscous liquid with a rate that is substantially less than that during the at least partial reacting of the viscous liquid. Otherwise, the probe tip potentially sinks into the layer of the viscous liquid affecting thickness measurements thereof.

It is preferable for the viscous liquid to have a viscosity greater than about 15 Pa-sec (Pascal-seconds). Viscous liquids with viscosities less than about 15 Pa-sec are undesirable because measurement errors associated with counterbalancing the probe tip on the surface thereof potentially occur.

The probe tip preferably has a diameter greater than about 0.5 mm (millimeters). Probe tips with diameters greater than about 0.5 mm are desirable because the oscillations thereof are easier to control. Additionally, the probe tip is optionally treated with the low surface energy compound to prevent the formation of a meniscus between the probe tip and the viscous liquid when the probe tip touches the planar surface of the viscous layer.

Additionally, the probe is made of a material which is nonreactive with respect to the viscous liquid. Suitable probe materials include quartz and stainless steel.

After the probe tip is counterbalanced on the planar surface of the viscous liquid, the thickness of the layer of the viscous liquid is determined. The thickness of the layer of the viscous liquid is determined relative to the bottom surface of the reservoir.

Once the thickness of the layer of the viscous liquid is determined, the viscous liquid is at least partially reacted. The term reacted as used in this disclosure refers to a physical or chemical process whereby the viscous liquid undergoes a volume change. The viscous liquid is at least partially reacted using any suitable method including exposure to light or heat. The reaction method used depends on the composition of the viscous liquid,.

As the viscous liquid reacts, the surface of the layer of the viscous liquid as well as the probe tip touching it are displaced in a direction perpendicular to the plane of the layer. The displacement of the probe tip is a measure of the linear displacement for the viscous liquid as it reacts.

Thereafter, the volume change for the partially reacted viscous liquid is determined as a function of the measured displacement for the layer of the viscous liquid. The displacement of the probe is optionally measured continuously or at predetermined times during the reaction step.

The linear displacement (one dimensional displacement) of the probe in a direction perpendicular to the plane of the viscous layer is related to the volume change of the viscous liquid as $$\% \text{ volume change} = 100(H_2 - H_1)/H_1 \quad (2)$$

wherein $H_1$ is the original thickness of the layer of the viscous liquid, and $H_2$ is its thickness after the reaction.

Figure 6:
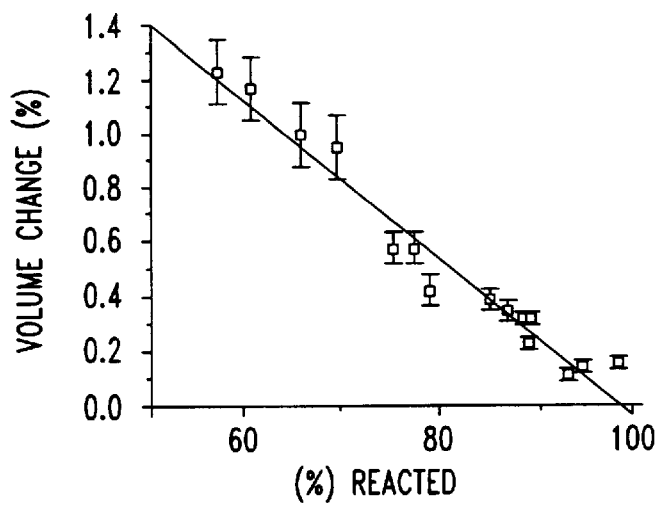
FIG. 6 shows a graph of the volume change for an acrylate-based polymer (Formulation 1) plotted as a function of the percent that it is reacted.
Figure 7:
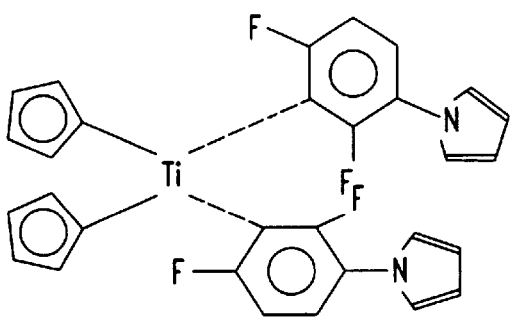
FIG. 7 depicts the structure of the photoinitiator, CGI-784.

The method of the present invention which determines volume changes of viscous liquids also provides information about the percent that the viscous liquid is reacted. For example FIG. 6 shows a graph of the volume change of an acrylate-based polymer plotted as a function of its reaction percent. The acrylate-based polymer has a formulation (Formulation 1) which is a mixture of about 30% by weight isobornyl acrylate, about 10% by weight N-vinyl carbazole, about 60% by weight ER351 (an oligomer comprising a polyether backbone with urethane acrylate ends groups, commercially available from Echo Resins Company), and less than about 1% by weight CGI-784 (a photoinitiator commercially available from Ciba Specialty Chemicals, having the structure shown in FIG. 7). The graph of FIG. 6 illustrates that the rate of volume change for Formulation 1 varies about linearly with its reaction percent. Thus, for Formulation 1 it is possible to measure the volume change during hardening as well as to predict what volume change is expected based on a particular reaction percent.

Figure 8:
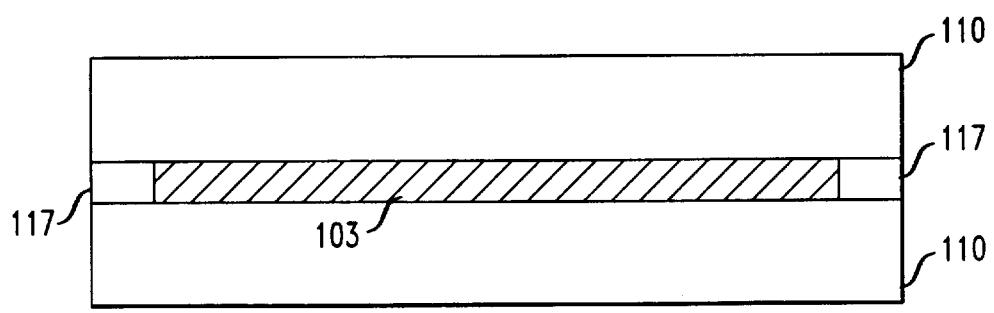
FIG. 8 illustrates an alternate embodiment of the present invention wherein the layer of the viscous liquid is formed between two rigid bodies.

In an alternate embodiment of the present invention, the viscous liquid 103 is confined between two rigid bodies 110, as shown in FIG. 8. The viscous liquid 103 is confined between the two rigid bodies 110 using any suitable method including an adhesive (not shown) and/or a spacer 117. At least one of the two rigid bodies preferably has a planar surface which contacts the viscous liquid forming the planar surface on the layer of the viscous liquid confined therebetween.

The two rigid bodies are preferably at least 0.1 mm (millimeters) thick. Rigid bodies that are less than 0.1 mm thick are undesirable because they potentially deform when the viscous liquid reacts providing inconsistent displacement measurements for the planar surface of the viscous liquid. Suitable materials for the two rigid bodies include glass and quartz slides.

The two rigid bodies are optionally coated with an adhesion promoter prior to confining the layer of the viscous liquid therebetween. The adhesion promoter improves the adhesion between the rigid bodies and the viscous liquid, preventing the formation of air pockets therebetween that potentially affect thickness measurements for the layer of the viscous liquid. Examples of adhesion promoters suitable for use with quartz slides and acrylate-based prepolymers include 3-(trimethoxysily)propyl methacrylate and (3-mercaptopropyl)trimethoxysilane.

Figure 9:
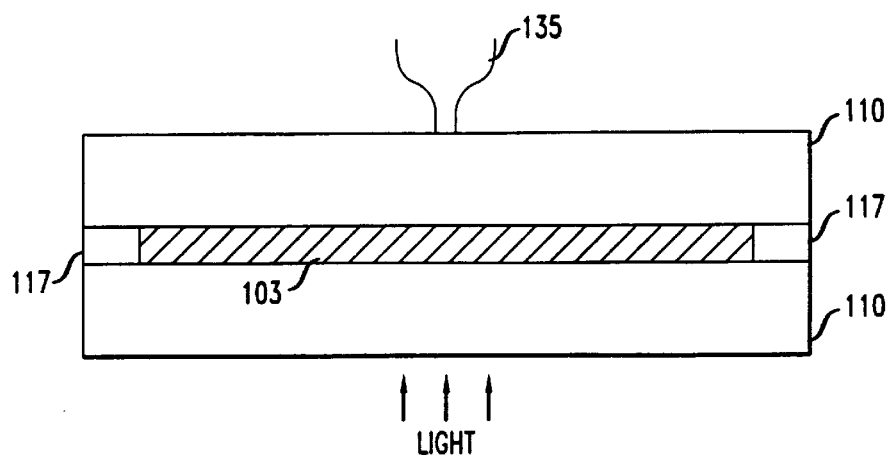
FIG. 9 is a cross-sectional view of the probe counterbalanced on the outer surface of one of the two rigid bodies shown in FIG. 8.

After the layer of the viscous liquid is confined between the two rigid bodies, the probe 135 is counterbalanced on an outer surface of one of the two rigid bodies, as shown in FIG. 9. The probe is preferably counterbalanced using a thermomechanical analyzer (TMA) (not shown). Suitable TMAs is are commercially available from Perkin-Elmer Co. The probe tip touches the outer surface of one of the two rigid bodies without oscillating. Thereafter, the thickness of the layer of the viscous liquid is determined relative to the thicknesses of at least one of the two rigid bodies. The viscous liquid is then at least partially reacted, the displacement of the probe tip measured, and the volume change for the viscous liquid determined, as described above.

When relatively thin layers of a viscous liquid (having a thickness/width ratio of less than about 1/50) are confined between the two rigid bodies, the displacement of the probe is related to the volume change for the viscous liquid according to equation (2). However, when relatively thick layers of the viscous liquid (having a thickness/width ratio greater than about 1/10) are confined between the two rigid bodies, the linear displacement of the probe in a direction perpendicular to the plane of the viscous layer is related to the volume change of the viscous liquid as $$\% \text{ volume change} = 100[(H_2 - H_1)/H_1]^3. \quad (3)$$

The following examples are provided to illustrate specific embodiments of the present invention.

EXAMPLE 1

An amount of an acrylate-based polymer with a Formulation 2, sufficient to cover an area of about 6 cm² was placed between two quartz plates. Each quartz plate was 2.5 cm×7.5 cm in area and had a thickness of about 1.0 mm.

Formulation 2 is a mixture of about 40% by weight of a monomer, about 60% by weight of an oligomer, and about 1% by weight compared to the monomer and oligomer of a photoinitiator. The monomer is isobornyl acrylate commercially available from Aldrich Chemical Company. The oligomer is ER-351 which has a molecular weight of about 2000 and comprises a polyether backbone with urethane acrylate end groups. ER-351 is commercially available from Echo Resin Company. The photoinitiator is CGI-784, having the structure shown in FIG. 7. CGI-784 is commercially available from Ciba-Specialty Chemicals.

The volumetric measurements for Formulation 2 were made using a Perkin Elmer 7e dynamic mechanical analyzer (DMA), used in a TMA mode. The DMA includes a quartz housing, a bottom plate, and a probe all made of quartz. The DMA was modified to permit optical access through the bottom plate. The two quartz plates with Formulation 2 confined therebetween was placed on the bottom plate within the housing of the DMA.

The thickness of the photoactive polymer was determined using the DMA. The quartz probe was zeroed on the bottom plate of the DMA. Thereafter, the thickness of the two quartz slides with the photoactive polymer confined therebetween was measured. The thickness of the glass slides, which were premeasured in the same apparatus were subtracted from the total thickness, providing the initial thickness for Formulation 2.

The probe was counterbalanced on the top surface of the two quartz slides with a force of about 5–10 mN (milliNewtons) and stabilized for about 20 minutes. Thereafter, Formulation 2 was exposed to a 250 watt quartz halogen lamp filtered to provide light of a wavelength between about 540 nm to about 850 nm for about 80 minutes. The intensity of the filtered light was about 10 mW/cm². The temperature of the quartz plates fluctuated by about ±0.2° C. As Formulation 2 was reacted, the height changes for the quartz probe were measured relative to the bottom plate of the DMA.

The calculated % volume change for Formulation 2 fully reacted was determined from $$\text{Calculated \% volume change} = -2.58 + 3100(\Sigma[w_i(F_i/MMW_i)]) \quad (4)$$

wherein $w_i$ is the weight fraction of the component in the mixture, $F_i$ is the functionality (e.g. monofunctional acrylates, difunctional acrylates, trifunctional acrylates) of the component in the mixture, and $MMW_i$ is the molecular weight of the component in the mixture. (Equation 4 is discussed in Pezron, E. et al., Modeling of UV Oligomers and Monomers Properties: Viscosity and Shrinkage", *RadTech '96 North America UV/EB Conference Proceedings*, Nashville, pp. 99–106 (1996) which is incorporated herein by reference). The calculated % volume change for Formulation 2 was about 6.0%.

Figure 10:
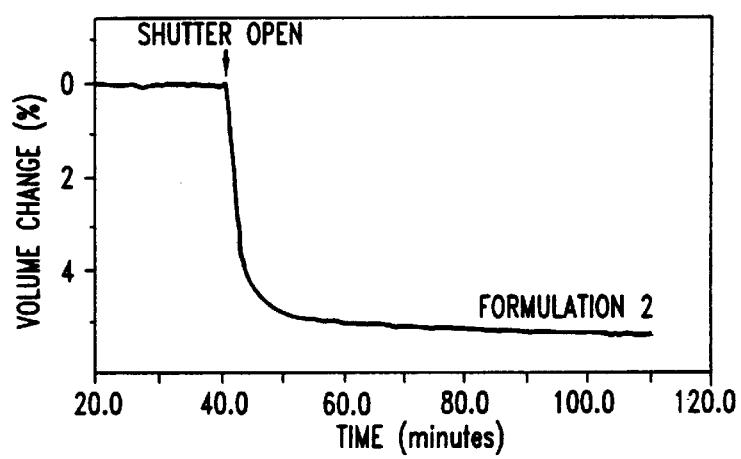
FIG. 10 is a graph of the volume change of the viscous liquid of Example 1 plotted as a function of time.

The graph of FIG. 10 shows the measured % volume change for Formulation 2 plotted as a function of the reaction time. The measured % volume change for Formulation 2 at about 110 minutes (fully reacted) was about 5.3%.

EXAMPLE 2

An amount of Formulation 1 was confined between two quartz slides as described in Example 1. Formulation 1 is a mixture of about 30% by weight isobornyl acrylate, about 10% by weight N-vinyl carbazole, about 60% by weight ER351 (an oligomer comprising a polyether backbone with urethane acrylate ends groups, commercially available from Echo Resins Company), and less than about 1% by weight CGI-784 (a photoinitiator commercially available from Ciba Specialty Chemicals.

Formulation 1 was about 63% prereacted by exposing it to light of a wavelength between about 540 nm to about 850 nm for about 50 minutes using the conditions described in Example 1.

Figure 11:
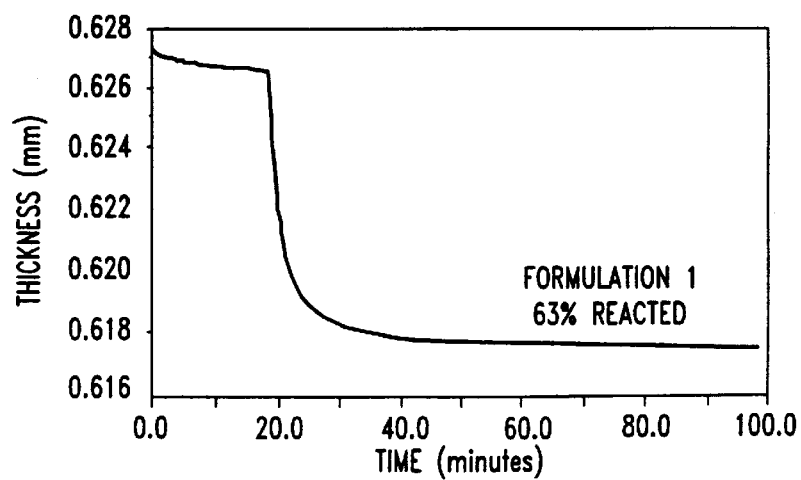
FIG. 11 is a graph of the volume change of the partially reacted viscous liquid of Example 2 plotted as a function of time.

After Formulation 1 was about 63% prereacted, the two quartz slides were placed on the bottom plate in the housing of the DMA. The quartz probe was zeroed on the bottom plate of the DMA. Thereafter, the quartz probe was counterbalanced on the top surface of the upper quartz slide. The thickness of the two quartz slides was subtracted from the total thickness, providing an initial thickness for the 63% prereacted Formulation 1 of about 0.626 mm, denoted as 150 in FIG. 11.

Thereafter, Formulation 1 was further reacted by exposing it to light of a wavelength between about 540 nm to about 850 nm for about 80 minutes using the conditions described in Example 1. As shown on the graph of FIG. 11, the thickness of Formulation 1 decreased approximately 0.0009 mm from the initial thickness of about 0.626 mm, denoted as 150, to about 0.617 mm, denoted as 155. This thickness reduction corresponds to a volume change of about 1.4%.

The invention claimed is:

1. A method for measuring volume changes of a layer of a viscous liquid, comprising the steps of:
   confining a layer of a viscous liquid on a portion of a first rigid body, wherein the layer of the viscous liquid has a planar top surface in relation to the first rigid body;
   measuring a thickness for the layer of the viscous liquid;
   at least partially reacting the layer of the viscous liquid; and
   determining the volume change for the at least partially reacted layer as a function of measuring the linear displacement of the planar top surface of the layer of the viscous liquid.

2. The method of claim 1 wherein the first rigid body includes a reservoir having sidewalls and a bottom surface and wherein the layer of the viscous liquid is confined within the reservoir.

3. The method of claim 1 wherein the first rigid body has a planar surface and the layer of the viscous liquid is confined between the planar surface and a second rigid body.

4. The method of claim 3 wherein the layer of the viscous liquid is confined between the planar surface of the first rigid body and the second rigid body with an adhesive.

5. The method of claim 2 wherein the thickness of the layer of the viscous liquid is measured by counterbalancing a probe on the planar top surface of the viscous liquid in the reservoir.

6. The method of claim 5 wherein the probe is counterbalanced on the planar top surface of the layer of the viscous liquid by touching the probe to the surface thereof with a force such that the probe descends below the planar top surface of the layer of the viscous liquid with a rate that is substantially less than that during the at least partial reacting of the viscous liquid.

7. The method of claim 3 wherein thickness of the layer of the viscous liquid that is confined between the first rigid body and the second rigid body is measured relative to the top surface of the second rigid body.

8. The method of claim 1 wherein the viscous liquid has a viscosity greater than about 15 Pa-sec (Pascal-seconds).

9. The method of claim 2 wherein the planar top surface on the layer of the viscous liquid is formed by controlling the surface energy in the reservoir of the rigid body so it has a surface energy that is less than or about equal to the surface energy of the layer of the viscous liquid formed therein.

10. The method of claim 9 wherein the surface energy in the reservoir of the rigid body is controlled by treating the sidewalls and bottom surface of the reservoir with a solution containing a low surface energy compound prior to confining the layer of the viscous liquid therein.

11. The method of claim 5, further comprising treating the probe with a solution containing a low surface energy compound prior to counterbalancing it on the planar top surface of the layer of the viscous liquid.

12. The method of claim 10, or 11 wherein the low surface energy compound is selected from the group consisting of alkyl silanes, siloxanes and polyfluorocarbon compounds.

13. The method of claim 12 wherein the alkyl silanes are selected from the group consisting of alkyl alkoxysilanes and alkyl halosilanes.

14. The method of claim 12 wherein the siloxanes are functionalized polysiloxanes.

15. The method of claim 12 wherein the polyfluorocarbon compounds are selected from the group consisting of fluoroalkyl alkoxysilanes, fluoroalkyl chlorosilanes, fluorinated acrylates, copolymers of perfluoro-2,2-dimethyldioxole and tetrafluoroethylene, and cyclized homopolymers of perfluorovinylbutenylether.

16. The method of claim 3, further comprising coating the first rigid body and the second rigid body with an adhesion promoter prior to confining the layer of the viscous liquid therebetween.

17. The method of claim 16 wherein the adhesion promoter is an alkoxysilane.

18. The method of claim 17 wherein the alkoxysilane is selected from the group consisting of 3-(trimethoxysilyl) propyl methacrylate and (3-mercaptopropyl) trimethoxysilane.

19. The method of claim 5 wherein the probe has a circular tip.

20. The method of claim 19 wherein the circular tip has a diameter greater than about 0.5 mm (millimeters).

21. The method of claim 1 wherein the viscous liquid is a mixture of at least one monomer and a photoinitiator.

22. The method of claim 1 wherein the viscous liquid is a mixture of an oligomer and a photoinitiator.

23. The method of claim 1 wherein the viscous liquid is a mixture of at least one monomer, an oligomer, and a photoinitiator.

24. The method of claim 21, or 23 wherein the at least one monomer is selected from the group consisting of isobornyl acrylate, 2-phenoxyethyl acrylate, di(ethyleneglycol) ethyl ether acrylate, N-carbazoylethyl acrylate, N-vinylcarbazole, vinylbenzoate, vinylnaphthoate, dichlorovinylbenzoate, N-vinyl-2-pyrrolidinone, vinyl 2-naphthylmercaptoacetate, benzylbenzoate, and stilbene.

25. The method of claim 22, or 23 wherein the oligomer has urethane acrylate end groups.

26. The method of claim 22, or 23 wherein the backbone of the oligomer is selected from the group consisting of polyethers, polyesters, polycarbonates, and polysiloxanes.

27. The method of claim 21, 22, or 23 wherein the photoinitiator is selected from the group consisting of bis (η-5-2,4-cyclopentadien-1-yl)bis[2,6-difluoro-3-(1H-pyroll-1-yl)phenyl]titanium, 2,2-diethoxyacetophenone, benzophenone, p-methoxybenzophenone, acetophenone, propiophenone, xanthone, benzoin, benzil, naphthoquinone, anthraquinone, t-butylperbenzoate, 1-hydroxycyclohexylphenyl ketone, and 2-hydroxy-2-methyl-1-phenylpropan-1-one.

28. The method of claim 1 wherein the viscous liquid is an epoxy.

29. The method of claim 28 wherein the epoxy is a diglycidyl ether of bisphenol-A mixed with a compound chosen from the group consisting of amines, polyamides, anhydrides, acids, and phenols.

30. The method of claim 28 wherein the epoxy is at least partially reacted with heat.

31. The method of claim 21, 22, or 23 wherein the mixture is at least partially reacted using light with a wavelength in the range of 240 nm (nanometers) to about 800 nm.

* * * * *